(12) United States Patent
Evans et al.

(10) Patent No.: US 6,971,058 B2
(45) Date of Patent: Nov. 29, 2005

(54) METHOD AND APPARATUS FOR FINDING VARIABLE LENGTH DATA PATTERNS WITHIN A DATA STREAM

(75) Inventors: David J. Evans, Ottawa (CA); John F. Pillar, Nepean (CA)

(73) Assignee: Nortel Networks Limited (CA)

( * ) Notice: Subject to any disclaimer, the term of this patent is extended or adjusted under 35 U.S.C. 154(b) by 375 days.

(21) Appl. No.: 10/026,206

(22) Filed: Dec. 21, 2001

(65) Prior Publication Data

US 2002/0087935 A1 Jul. 4, 2002

Related U.S. Application Data

(60) Provisional application No. 60/287,575, filed on Dec. 29, 2000.

(51) Int. Cl.[7] .......................... H03M 13/00; G06F 11/10
(52) U.S. Cl. ........................ 714/807; 714/821; 714/758
(58) Field of Search ................................ 714/758, 800, 714/801, 805, 807, 819, 821

(56) References Cited

U.S. PATENT DOCUMENTS

| | | | | |
|---|---|---|---|---|
| 5,570,362 A | * | 10/1996 | Nishimura | 370/466 |
| 5,703,887 A | * | 12/1997 | Heegard et al. | 714/775 |
| 5,832,235 A | * | 11/1998 | Wilkes | 709/247 |

\* cited by examiner

*Primary Examiner*—Joseph Torres
(74) *Attorney, Agent, or Firm*—Steubing McGuinness & Manaras LLP (57) ABSTRACT

A method and apparatus for searching for a character pattern within a data stream. A checksum is computed for one or more patterns for which the data stream will be searched. The patterns may be of the same length or they may be of different lengths. A shift register is used to sequentially parse through the data stream and compute the checksum of a series of bytes in the data stream. If the checksum of the bytes in the data stream that have been shifted into the register matches the checksum from one of the character patterns, then the character pattern corresponding to the checksum has been found. The system may search multiple character patterns simultaneously by using multiple checksum generators in parallel.

22 Claims, 5 Drawing Sheets

METHOD AND APPARATUS FOR FINDING VARIABLE LENGTH DATA PATTERNS WITHIN A DATA STREAM

CROSS-REFERENCE TO RELATED APPLICATIONS

This application claims the benefit of U.S. Provisional Application No. 60/287,575, filed Dec. 29, 2000.

STATEMENT REGARDING FEDERALLY SPONSORED RESEARCH OR DEVELOPMENT

N/A

REFERENCE TO A SEQUENCE LISTING

N/A

FIELD OF THE INVENTION

The invention relates generally to the field of content switching, and more specifically, to the use of hardware to implement a serial search through a data stream.

BACKGROUND

Conventional content switches search through packets of data to identify the nature of the traffic so that they make an intelligent switching decision based on the traffic content. These switches employ software that performs a serial search through the packets to determine data patterns. The fact that the search is serial in nature means that it starts with the first portion of the data, determines if the desired pattern is present then moves on to the next portion of the data. Additionally, conventional searches are limited to searching for one data pattern at a time. While this may provide acceptable performance when searching through short data packets, it is generally a relatively slow method that does not scale well when the search space becomes larger and/or the number of searched data patterns becomes greater.

It would thus be beneficial to have a method of searching for data patterns in a quick and efficient manner which scales well for larger search spaces and/or multiple search patterns.

SUMMARY OF THE INVENTION

The invention provides methods and apparatus for searching a data stream for one or more patterns of characters.

An aspect of the invention provides a method that includes computing a checksum for the character pattern in question, computing another checksum for a predetermined portion of the data stream, and comparing the checksums to determine if there is a match.

Another aspect of the invention provides apparatus that includes a register, and a processor (e.g. a state machine, an Application Specific Integrated Circuit ("ASIC"), etc) for copying a predetermined portion of the data stream into the register. The apparatus also includes a checksum generator configured to compute a checksum for the character pattern and another checksum for the predetermined portion of the data stream. The apparatus includes at least one comparator configured to compare the checksums to determine if a match exists.

Still another aspect of the invention provides a method that includes computing a checksum for the character pattern in question. The method also includes shifting a byte of data from the data stream into a register, and computing another checksum incorporating the new byte of data. Then continuing shifting bytes of data into the register and computing the another checksum for the combined shifted bytes until a length of the shifted bytes is equal to the length of the character pattern in question. The method then compares the checksums to determine if a match exists. The shifting of bytes into the register continues if the comparison does not result in a match. Then the another checksum for the combined data bytes is recomputed by removing an oldest byte of data from the combination and adding the newest byte of data to the recomputation. Then the recomputed checksum is compared the checksum to determine if a match exists. The shifting of bytes into the register, the recomputing of the another checksum, and the comparison of checksums continues until a match exists.

An aspect of the invention also includes an apparatus that includes a register module for temporarily storing a portion of the data stream. It includes a processor module that is electrically connected to the register module. The processor module is used to copy the portion of the data stream into the register module. The apparatus includes a checksum generator module for computing a checksum for the reference character pattern and for computing another checksum for the portion of the data stream that is shifted into the register module. The apparatus includes a comparison module electrically connected to the checksum generator module for comparing the checksums to determine if a match exists.

The invention will next be described in connection with certain illustrated embodiments and practices. However, it will be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which.

DETAILED DESCRIPTION OF THE INVENTION

The invention provides methods and apparatus for searching a data stream for one or more data patterns which may vary in length. The invention performs one or more simultaneous serial searches, using checksums to represent a particular data pattern. Since checksums are not always unique, it is preferable to select a checksum algorithm with low probability of the same checksum being assigned to different patterns (although many different checksum algorithms may be suitable varying in nature and/or length). It is also preferable to select an incremental checksum algorithm for reasons that will be discussed later.

Figure 1:
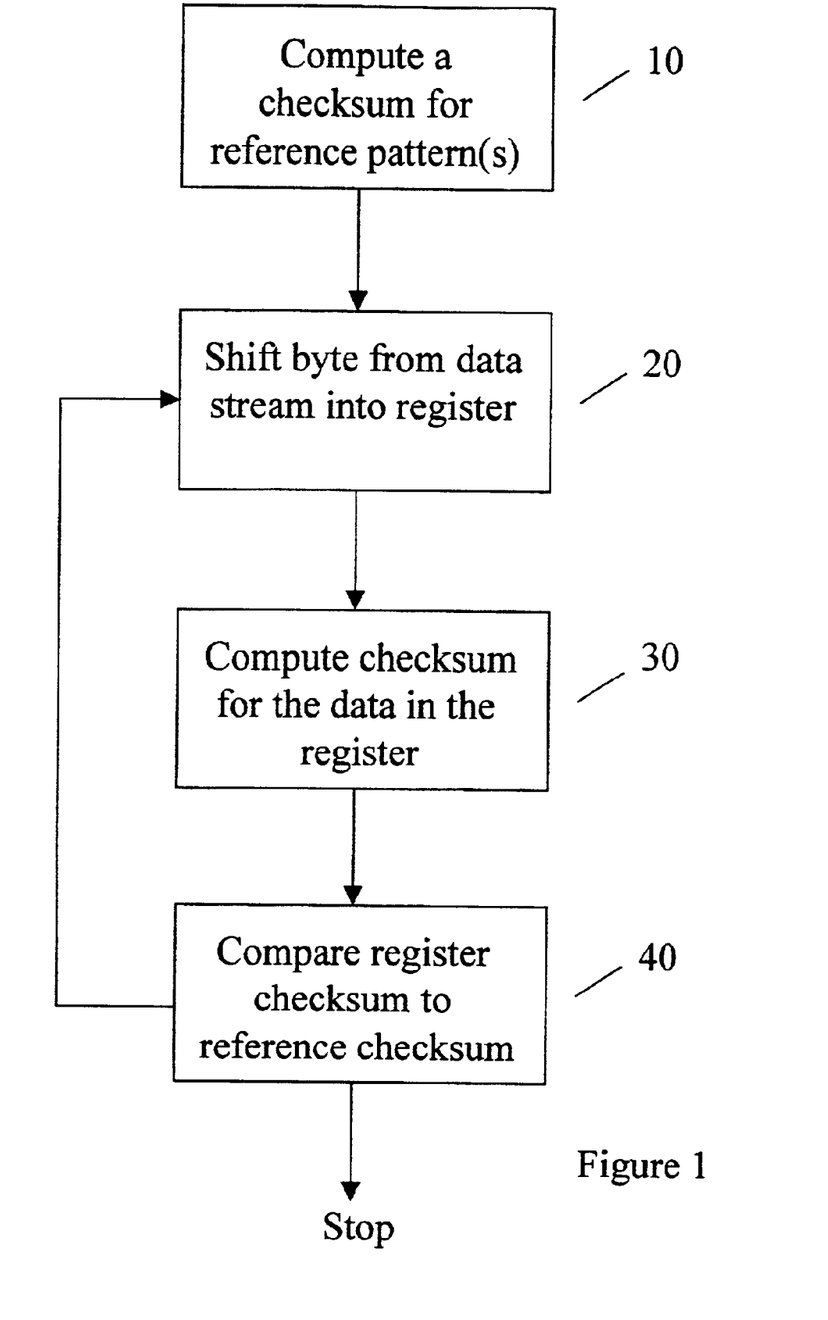
FIG. 1 depicts a flow chart of an embodiment of the invention.

FIG. 1 presents a flow chart that illustrates an embodiment of the present invention. At Step 10, a checksum is computed for the data pattern to be found. This is the equivalent of assigning each pattern a particular signature. Each of the patterns sought may be any length and need not be the same length. Assigning a checksum to a pattern is accomplished through a checksum generator.

Figure 4:
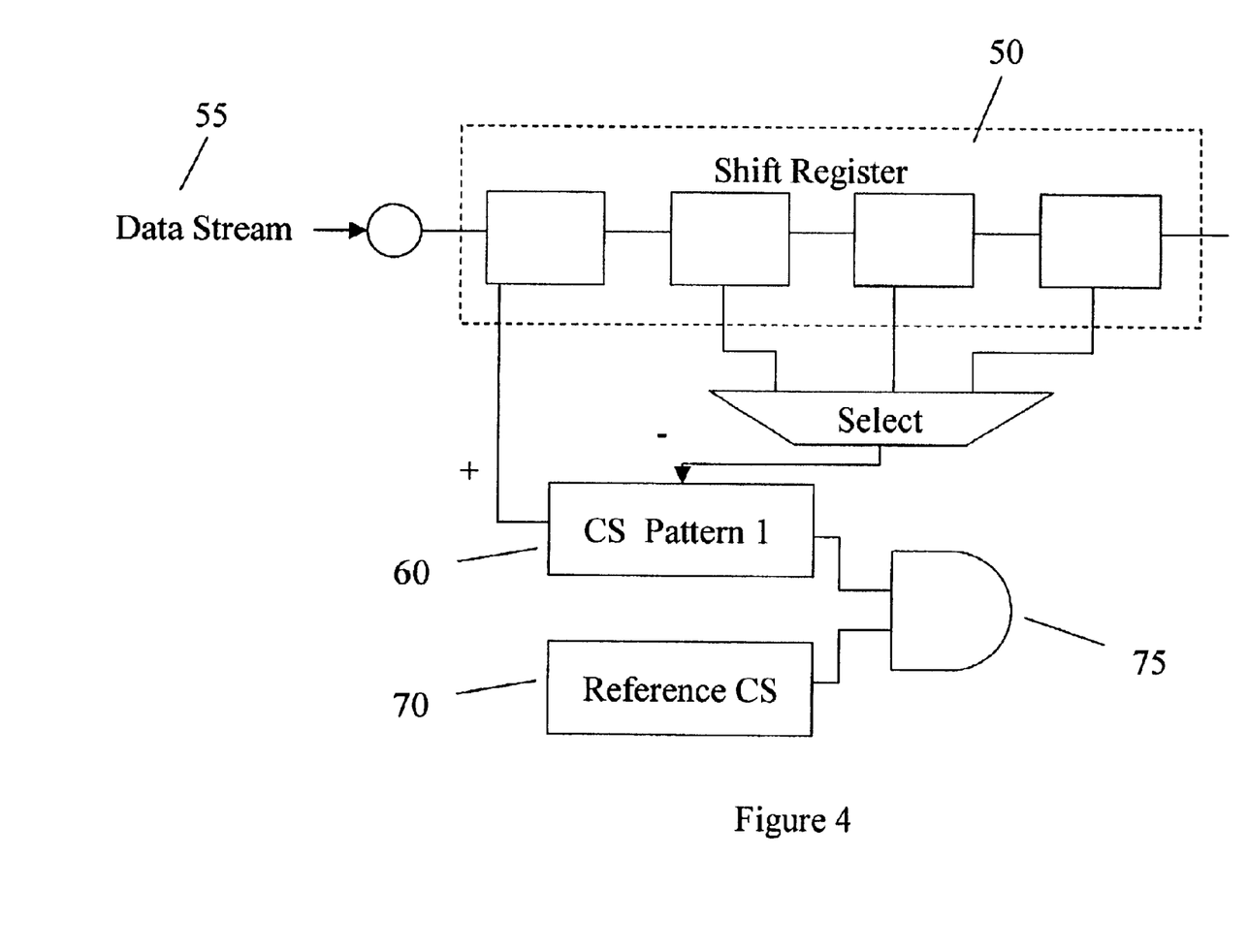
FIG. 4 illustrates a block diagram of an embodiment of the invention.

For illustrative purposes only, the following discussion assumes that a 1 byte pattern is sought and that the predetermined checksum is 1 byte in length (FIG. 4).

The data stream may reside at some physical memory location. At step, 20, a byte from the data stream is shifted into a shift register 50, starting with the first byte in the data stream 55. As will be seen later, multiple bytes may be applied at the same time (FIG. 5), wherein several bytes are shifted into the register 50 at a time, and an equal number of unique checksums are computed, each corresponding to a shift of one two three, etc. bytes. At step 30, the checksum generator 60 calculates the checksum of the byte in the shift register. At step 40, the calculated checksum is then compared to the checksum 70 assigned to the data pattern that the system is searching for. If a match exists, the search may stop, or it may continue until the entire data stream 55 has been searched or until some predetermined portion of the data stream 55 has been searched, or until other patterns that the system is looking for are found.

If no match is found or the user has chosen to search the entire data stream or some other portion of the data stream before further processing, then the byte currently in the shift register 50 is shifted forward and the next byte in the data stream is shifted into the register 50. Checksum generator 60 calculates a new checksum incorporating the new byte and removing the contribution of the oldest byte, then the new checksum is compared to the checksum 70 assigned to the data pattern for which the system is searching.

Figure 2:
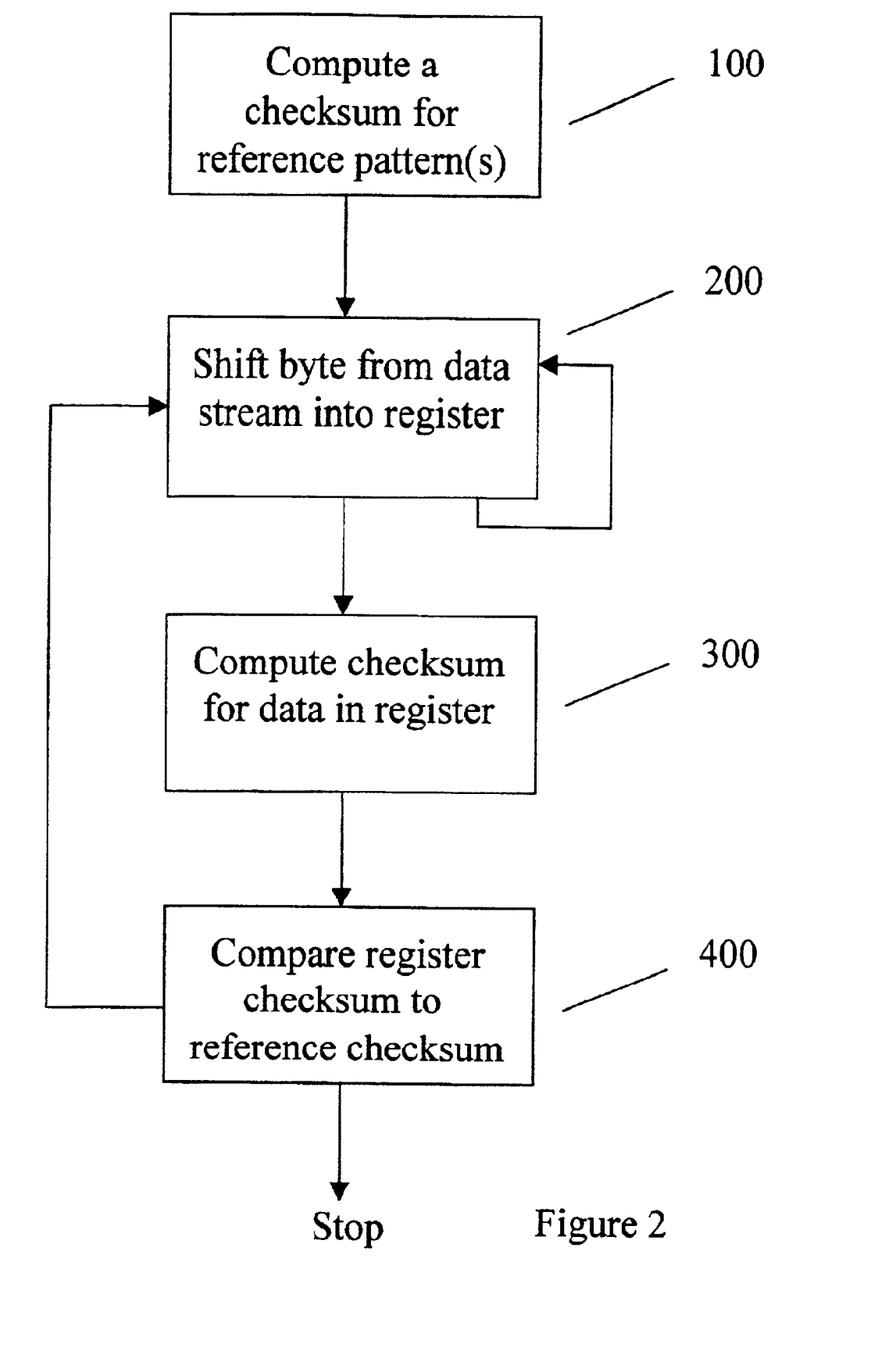
FIG. 2 depicts a flow chart of another embodiment of the invention.

FIG. 2 illustrates a flow chart of another embodiment of the present invention. At step 100, a checksum is computed for the data pattern to be found. In this embodiment, it is assumed that there is a 5 byte pattern to be found and it has a checksum that is one bytes in length (FIG. 4 applies to this embodiment as well).

At step 200, a byte from the data stream 55 is shifted into a shift register 50, starting with the first byte in the data stream 55. The checksum generator 60 generates a checksum for the first byte. Then the register 50 is shifted and a second byte is entered into the shift register 50. A new incremental checksum is generated which now incorporates the first and the second bytes. Since the search pattern is 5 bytes long, this continues until 5 bytes have been shifted into the register 50. At that point, the checksum generated for the 5 bytes of data that have been shifted into the shift register 50 are compared using comparator 75 with the checksum 70 of the data pattern the system is looking for. If a match is found, the search may stop or it may continue until the entire data stream has been searched, or until some portion of the data stream has been searched, or until some predetermined number of other matches are found.

If no match is found the process reverts to Step 200 and another byte of the data stream is shifted into the shift register. The checksum generator 60 removes the oldest byte from the checksum and generates a new checksum for the new set of 5 bytes. This is when the advantages of selecting an incremental checksum algorithm becomes apparent. Incremental algorithms make it easy to remove the contribution of the old byte from the checksum and replace it with the new byte. The new checksum is calculated and compared to the checksum the system is looking for. This continues either until a match is found, a predetermined portion of the data stream is processed or the entire data stream is processed (depending upon the configuration).

Figure 3:
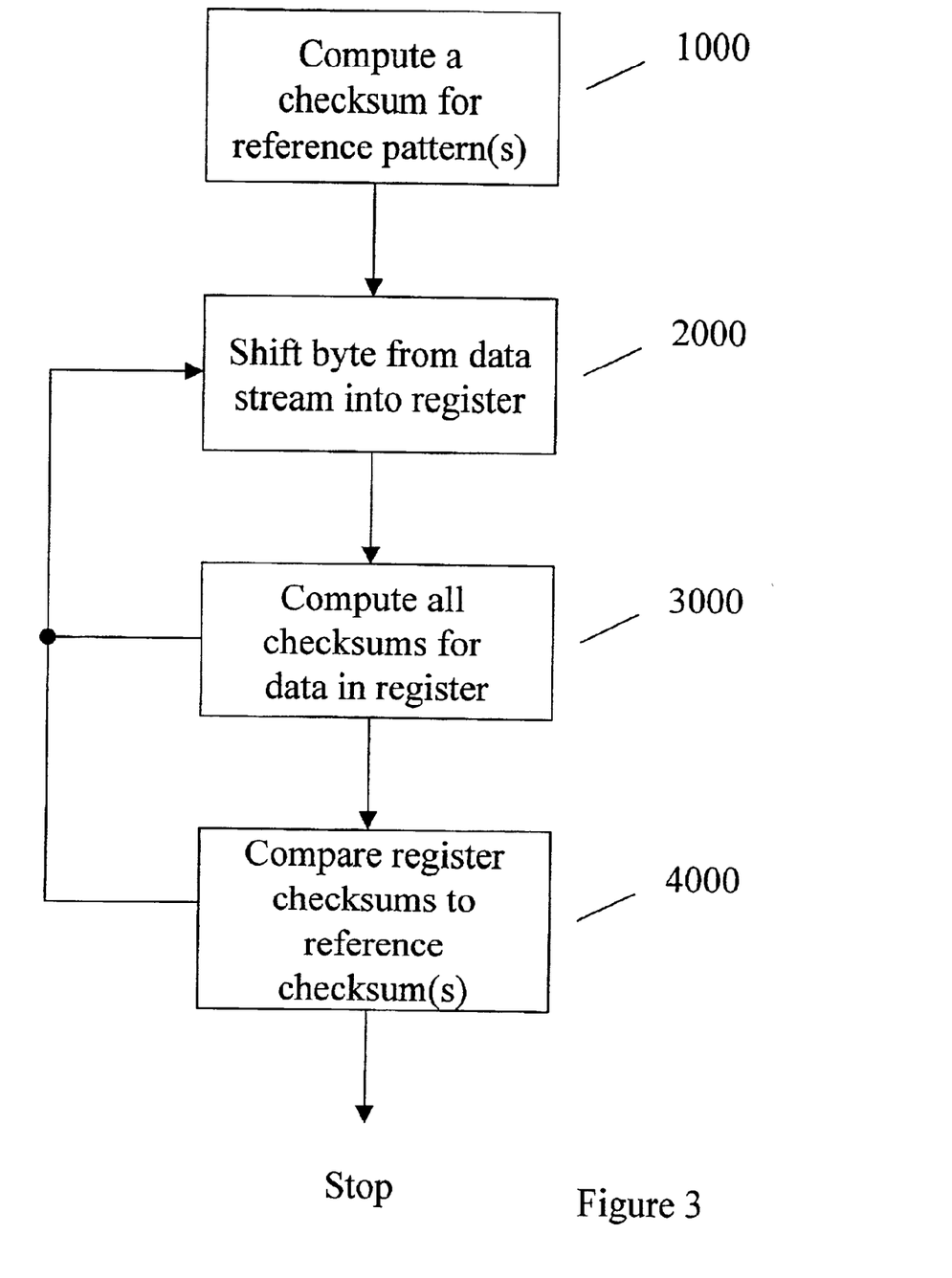
FIG. 3 illustrates a flow chart of still another embodiment of the invention.

FIG. 3 provides a flow chart of another embodiment of the present invention. In this embodiment, it is assumed that there are multiple patterns of multiple lengths with multiple checksums.

In step 1000, checksums are assigned to the different patterns sought. For illustrative purposes only, four patterns are sought (Pattern 1, Pattern 2, Pattern 3, Pattern 4). Two patterns (Pattern 1 and Pattern 2) are 2 bytes long, and two patterns (Pattern 3 and Pattern 4) are 10 bytes long.

At step 2000, a byte from the data stream is shifted into the shift register 50, which is at least as long as the pattern being searched for, starting with the first byte in the data stream. At step 3000, multiple checksum generators 60 generate check sums for the first byte. The number of checksum generators may be determined based on pattern length or by the number of different patterns to search for. In the current example, there are four checksum generators (1 for each of the four patterns, although there could be two since there are only two different pattern lengths in this example). Each checksum generator will operate in the manner discussed above. Once the number of bytes is equal to the number of bytes in the checksum length the process continues to Step 4000. Those skilled in the art will recognize that, in practice, it may be simpler to check for a match after each byte is shifted even if the byte pattern is longer than 1 byte. Thus, this configuration also falls within the scope of the invention. Otherwise, the process reverts to Step 2000. In the current example, neither Pattern Length 1 nor Pattern Length 2 is 1 byte long. Therefore, the process reverts to Step 2000. A new byte from the data stream is shifted into the shift register and provided to each of the checksum generators for checksum generation.

At step 4000, the calculated checksum or checksums are compared against the corresponding checksums the system is looking for. Therefore, the computed checksum of checksum generator 1 may be compared to the predetermined checksum of Pattern 1 and the computed checksum of checksum generator 2 may be compared to the predetermined checksum of Pattern 2, since each of these checksums covers a pattern that is 2 bytes in length. If a match exists, the search for these patterns may stop, they may continue for a predetermined number of bytes, until another search pattern is found or until the entire data stream has been searched.

If no match was found the process reverts to Step 2000.

Figure 5:
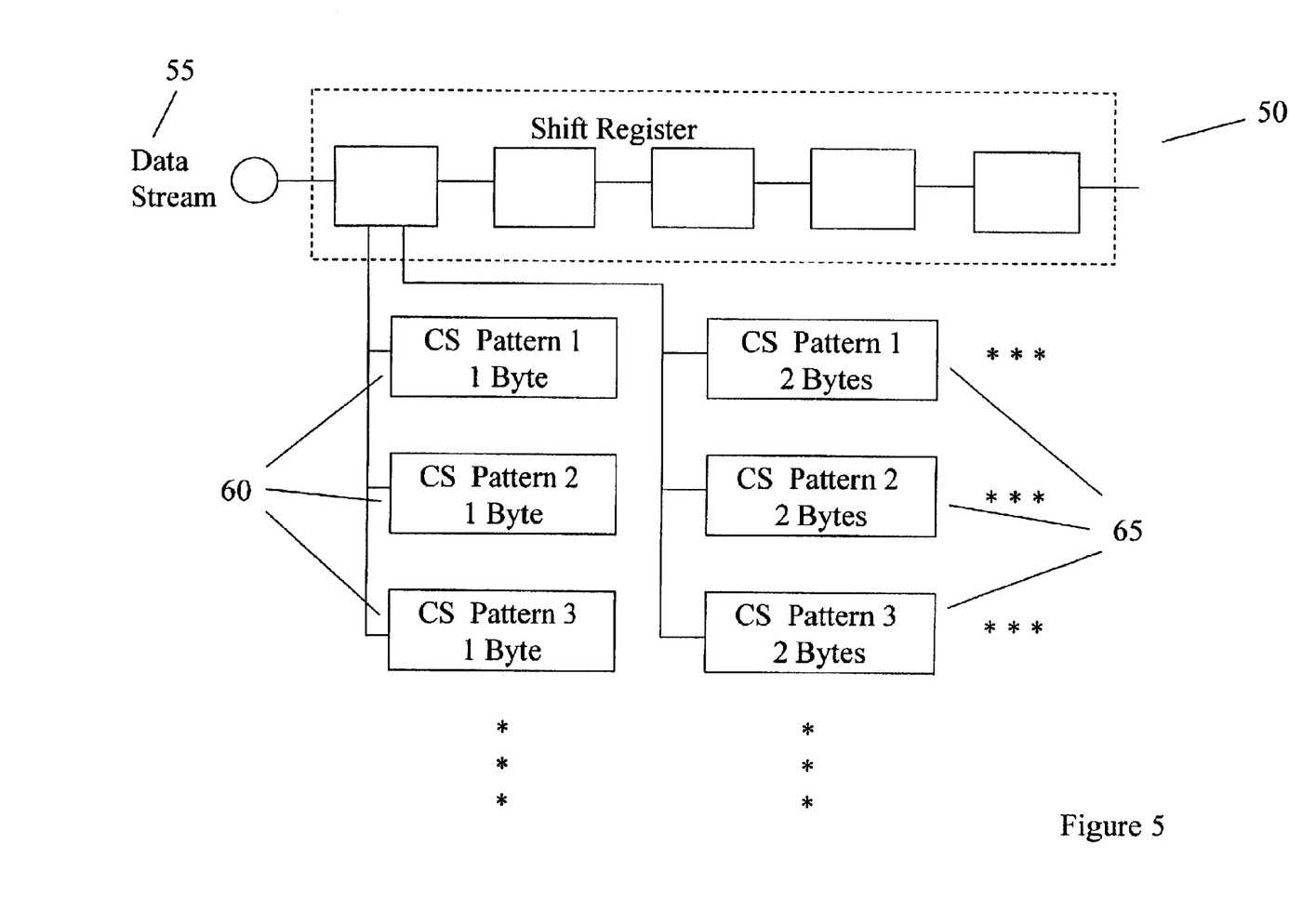
FIG. 5 depicts a block diagram of another embodiment of the invention.

The system may be tuned to go faster or slower by simultaneously checking more patterns and/or by applying multiple bytes to the checksum generators 65. As illustrated in FIG. 5, there can be two levels of parallelism designed into the system. The system may search multiple patterns in parallel by adding checksum generators 60 for each pattern and/or it can search for the same pattern using checksum generators 65 that apply different numbers of bytes at the same time.

Those skilled in the art will recognize that different checksums may be computed simultaneously and at different times (e.g. as each byte is received, as multiple bytes are received, or as the correct number of bytes are received).

Having described the invention, what is claimed is:

1. A method of searching through packets of data traffic within a data stream to identify the nature of the traffic in support a switching decision based on traffic content, comprising the steps of:

computing a plurality of character patterns associated with the traffic content, where a first character pattern has a first length and a second character pattern has a second length and the first length is not equal to the second length;

computing a first checksum for each said character pattern;

computing a second checksum for a predetermined portion of said data stream;
comparing said second checksum to said first checksums to determine if there is a match, a match being indicative of a probability that the data stream includes traffic content associated with the matching character pattern; and
if there is a match, computing a switching decision based at least in-part on the traffic content.

2. The method according to claim 1 further comprising shifting said portion of said data stream into a shift register.

3. The method according to claim 2 further comprising: shifting more data from said data stream into said shift register if said comparison does not result in a match; and recomputing said second checksum by removing an oldest unit of data and adding said more data to said recomputation.

4. The method according to claim 3 further comprising: continuing said shifting and said recomputing until said comparison results in a match.

5. The method according to claim 1 further comprising: shifting multiple portions of said data stream into a shift register.

6. The method according to claim 5 further comprising computing a plurality of second checksums based upon different parts of said multiple portions of said data stream.

7. The method according to claim 6 wherein said character pattern includes a plurality of character sub-patterns and said checksum comprises a plurality of sub-checksums; said method further comprising simultaneously comparing said plurality of second checksums to at least two of said plurality of sub-checksums to determine if there are any matches.

8. The method according to claim 7 wherein at least two of said plurality of sub-checksums have different lengths.

9. The method according to claim 1 wherein said character pattern includes a plurality of character sub-patterns and said checksum comprises a plurality of sub-checksums; said method further comprising simultaneously comparing said second checksum to at least two of said plurality of sub-checksums to determine if there are any matches.

10. The method according to claim 1 wherein said character pattern includes a plurality of character sub-patterns and said checksum comprises a plurality of sub-checksums; said method further comprising comparing said second checksum to one of said plurality of sub-checksums to determine if there is a match; recomputing said second checksum based upon a longer portion of said data stream; and comparing said recomputed second checksum to at least another of said plurality of sub-checksums.

11. The method according to claim 1 wherein said potion of said data stream includes a byte of data.

12. The method according to claim 1 wherein said potion of said data stream includes a plurality of bytes of data.

13. Apparatus that searches through packets of data traffic to identify the nature of the traffic in support of a switching decision based on traffic content within a data stream comprising:
logic operable to compute a plurality of character patterns associated with the traffic content, where a first character pattern has a first length and a second character pattern has a second length, and the first length is not equal to the second length;
a register;
a processor for copying a predetermined portion of said data stream into said register;
at least checksum generator configured to compute a first checksum for each said character pattern and a second checksum for said predetermined portion;
at least one comparator configured to compare said second checksum to said first checksum, a match being indicative of a probability that the data stream includes traffic content associated with the character pattern; and
logic operable in response to a match to computing a switching decision based at least in-part on the traffic content.

14. The apparatus according to claim 13 wherein said register further includes a plurality of sub-registers.

15. The apparatus according to claim 13 wherein said predetermined portion of said data stream is a byte of data.

16. The apparatus according to claim 13 wherein said predetermined portion of said data stream is a plurality of bytes of data.

17. The apparatus according to claim 13 wherein said checksum generator is configured to respectively compute a plurality of first checksums for a plurality of character patterns and to compute the second checksum for said predetermined portion; and, wherein said at least one comparator includes a plurality of sub-comparators each configured to respectively compare said second checksum to different ones of said plurality of first checksums.

18. The apparatus according to claim 17 wherein at least two of said plurality of first checksums have different lengths.

19. The apparatus according to claim 17 wherein said checksum generator comprises a plurality of checksum sub-generators.

20. The apparatus according to claim 13 wherein said processor is configured to shift more data from said data stream into said register if said comparator does not detect a match; and, said checksum generator is configured to recompute said second checksum by removing an oldest unit of data from said second checksum recomputation and adding said more data to said recomputation.

21. A method of searching through packets of data traffic within a data stream to identify the nature of the traffic in support of a switching decision based on traffic content, comprising the steps of:
computing a plurality of character patterns associated with the traffic content, where a first character pattern has a first length and second character pattern has a second length, and the first length is not equal to the second length;
computing a first checksum for each said character pattern, wherein each said character pattern has a length;
shifting a byte of data from said data stream into a register;
computing a second checksum for said byte of said data stream;
continuing said shifting and computing of the second checksum until a length of said shifted bytes of data is equal to said length of at least one of said character patterns;
comparing said second checksum to each said first checksum having a pattern of equal length to determine if a match exists;
shifting another byte of data from said data stream into said register if said comparison does not result in a match; and
recomputing said second checksum by removing an oldest byte of data from said second checksum recomputation and adding said another byte of data to said recomputation;
comparing said recomputed checksum to each said checksum to determine if a match exist;

continuing said shifting another byte, said recomputing, and said comparing until a match exists, a match being indicative of a probability that the data stream includes traffic content associated with the character pattern, and if there is a match, computing a switching decision based at least in-part on the traffic content.

22. Apparatus that searches through packets of data traffic of a data stream to identify the nature of the traffic in support of a switching decision based on traffic content, comprising:

logic operable to compute a plurality of character patterns associated with the traffic content, where a first character pattern has a first length and a second character pattern has a second length, and the first length is not equal to the second length;

register means for temporarily storing a portion of said data stream;

processor means, electrically coupled to said register means, for copying said portion of said data stream into said register means;

checksum generator means for computing a first checksum for each said character pattern and for computing a second checksum for said portion of said data stream;

comparison means coupled to said checksum generator means for comparing said second checksum to each said first checksum to determine if a match exists, a match being indicative of a probability that the data stream includes traffic content associated with the character pattern; and logic operable in response to a match to computing a switching decision based at least in-part on the traffic content.

* * * * *

UNITED STATES PATENT AND TRADEMARK OFFICE
CERTIFICATE OF CORRECTION

PATENT NO. : 6,971,058 B2  Page 1 of 1
APPLICATION NO. : 10/026206
DATED : November 29, 2005
INVENTOR(S) : Evans et al.

It is certified that error appears in the above-identified patent and that said Letters Patent is hereby corrected as shown below:

Column 4, line 59, support of a switching decision based---

Column 4, line 64, second length, and the first length---

Column 5, line 49, 11. The method according to claim 1 wherein said [portion] portion Column 5, line 51, 12. The method according to claim 1 wherein said [portion] portion Column 5, line 65, at least one checksum generator configured---

Signed and Sealed this

First Day of August, 2006

JON W. DUDAS
*Director of the United States Patent and Trademark Office*